(12) United States Patent
Pang et al.

(10) Patent No.: US 10,554,310 B2
(45) Date of Patent: *Feb. 4, 2020

(54) METHOD AND SYSTEM FOR WAVEGUIDE DELAY BASED EQUALIZATION WITH CURRENT AND OPTICAL SUMMING IN OPTICAL COMMUNICATION

(71) Applicant: Luxtera, Inc., Carlsbad, CA (US)

(72) Inventors: Simon Pang, San Diego, CA (US); Joseph Balardeta, Encinitas, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,357

(22) Filed: Mar. 15, 2019

(65) Prior Publication Data

US 2019/0215078 A1 Jul. 11, 2019

Related U.S. Application Data

(63) Continuation of application No. 15/636,093, filed on Jun. 28, 2017, now Pat. No. 10,243,672.

(Continued)

(51) Int. Cl.
*H04B 10/66* (2013.01)
*H04B 10/25* (2013.01)
(Continued)

(52) U.S. Cl.
CPC ............ *H04B 10/66* (2013.01); *G02B 6/34* (2013.01); *G02B 6/4246* (2013.01);
(Continued)

(58) Field of Classification Search
CPC ...... G02B 6/34; G02B 6/4246; G02B 6/4295; G02F 1/225; G02F 2001/212;
(Continued)

(56) References Cited

U.S. PATENT DOCUMENTS 4,868,896 A * 9/1989 Pietzsch ................ H04B 10/61
398/204
6,649,900 B2 * 11/2003 Filkins ..................... H03F 3/08
250/214.1

(Continued)

*Primary Examiner* — Amritbir K Sandhu
(74) *Attorney, Agent, or Firm* — McAndrews, Held & Malloy

(57) ABSTRACT

Methods and systems for waveguide delay based equalization with current and optical summing in optical communication are disclosed and may include an optoelectronic receiver including a directional coupler, two or more photodetectors, and one or more current mirrors. The optoelectronic receiver may be operable to: receive an input optical signal; split the input optical signal into first and second optical signals using the directional coupler; generate a first electrical from the first optical signal using a first photodetector; generate a second electrical signal from the second optical signal using a second photodetector; mirror the second electrical signal using the current mirror; and sum the first electrical signal with the amplified second electrical signal. The optoelectronic receiver may be operable to delay the first optical signal before generating the first electrical signal, using a waveguide delay.

20 Claims, 8 Drawing Sheets

Related U.S. Application Data

(60) Provisional application No. 62/356,941, filed on Jun. 30, 2016.

(51) Int. Cl.
  *H04B 10/67* (2013.01)
  *H04B 10/69* (2013.01)
  *G02B 6/42* (2006.01)
  *G02F 1/225* (2006.01)
  *G02B 6/34* (2006.01)
  *G02F 1/21* (2006.01)

(52) U.S. Cl.
  CPC ........... *G02B 6/4295* (2013.01); *G02F 1/225* (2013.01); *H04B 10/2504* (2013.01); *H04B 10/67* (2013.01); *H04B 10/6971* (2013.01); *G02F 2001/212* (2013.01)

(58) Field of Classification Search
  CPC .... H04B 10/2504; H04B 10/66; H04B 10/67; H04B 10/6971
  USPC .................................................. 398/202–214
  See application file for complete search history.

(56) References Cited

U.S. PATENT DOCUMENTS

| | | | | |
|---|---|---|---|---|
| 6,720,806 B1* | 4/2004 | Merrill | ............... | H03K 5/00006 327/116 |
| 7,200,344 B1* | 4/2007 | Hoshida | ............ | H04B 10/0779 398/176 |
| 7,477,852 B2* | 1/2009 | Agarwal | ............. | H04B 10/674 398/202 |
| 8,320,779 B2* | 11/2012 | Fukuchi | ................ | H04B 10/66 398/158 |
| 8,471,639 B2* | 6/2013 | Welch | ...................... | H03F 1/34 330/308 |
| 8,625,935 B2* | 1/2014 | Mekis | ................... | G02F 1/313 385/3 |
| 9,515,736 B2* | 12/2016 | Hemenway, Jr. | .. | H04B 10/2581 |
| 10,057,091 B2* | 8/2018 | Welch | ................ | H04L 25/0272 |
| 2006/0157646 A1* | 7/2006 | Uchida | ................... | H04B 10/66 250/214 R |
| 2007/0097349 A1* | 5/2007 | Wada | ..................... | G01S 7/493 356/4.06 |
| 2007/0158663 A1* | 7/2007 | Holcombe | ............ | H01L 25/167 257/82 |
| 2008/0019463 A1* | 1/2008 | Ikeuchi | ................ | H04B 10/677 375/331 |
| 2009/0034967 A1* | 2/2009 | Tao | ...................... | H04B 10/677 398/33 |
| 2009/0074428 A1* | 3/2009 | Liu | .................... | H04B 10/2513 398/208 |
| 2009/0226187 A1* | 9/2009 | Tanimura | ............... | H04B 10/60 398/202 |
| 2009/0252505 A1* | 10/2009 | Terada | .................. | H04B 10/677 398/208 |
| 2010/0004694 A1 | 1/2010 | Chraplyvy | | |
| 2010/0040383 A1* | 2/2010 | Hironishi | ............... | H04B 10/66 398/208 |
| 2010/0046948 A1* | 2/2010 | Chraplyvy | ............ | H04B 10/677 398/79 |
| 2010/0092185 A1* | 4/2010 | Nemoto | ............ | H04B 10/2513 398/208 |
| 2010/0284703 A1* | 11/2010 | Suzuki | ............. | H01L 31/02019 398/212 |
| 2012/0001166 A1* | 1/2012 | Doany | ................. | G02B 6/4246 257/43 |
| 2012/0020676 A1* | 1/2012 | Chung | ................ | H04B 10/677 398/202 |
| 2013/0028596 A1* | 1/2013 | Suzuki | .............. | H04B 10/6931 398/25 |
| 2013/0287392 A1* | 10/2013 | Heimbuch | ......... | H04B 10/0799 398/38 |
| 2014/0117212 A1* | 5/2014 | Imai | ....................... | H03F 3/087 250/208.2 |
| 2016/0079936 A1* | 3/2016 | Hutchins | .............. | H03G 3/3084 250/214 A |
| 2016/0080183 A1* | 3/2016 | Yun | ........................ | H04L 27/06 375/320 |
| 2017/0048000 A1* | 2/2017 | Zocher | ...................... | H03F 3/08 |
| 2018/0006731 A1* | 1/2018 | Pang | ................... | H04B 10/66 |
| 2018/0006732 A1* | 1/2018 | Pang | .................. | H04B 10/6931 |

* cited by examiner

METHOD AND SYSTEM FOR WAVEGUIDE DELAY BASED EQUALIZATION WITH CURRENT AND OPTICAL SUMMING IN OPTICAL COMMUNICATION

CROSS-REFERENCE TO RELATED APPLICATIONS/INCORPORATION BY REFERENCE

This application is a continuation of U.S. patent application Ser. No. 15/636,093 filed on Jun. 28, 2017, which claims priority to and the benefit of U.S. Provisional Application 62/356,941 filed on Jun. 30, 2016, each of which is hereby incorporated herein by reference in its entirety.

FIELD

Certain embodiments of the disclosure relate to semiconductor photonics. More specifically, certain embodiments of the disclosure relate to a method and system for waveguide delay based equalization with current and optical summing in optical communication.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for waveguide delay based equalization with current and optical summing in optical communication, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1A:
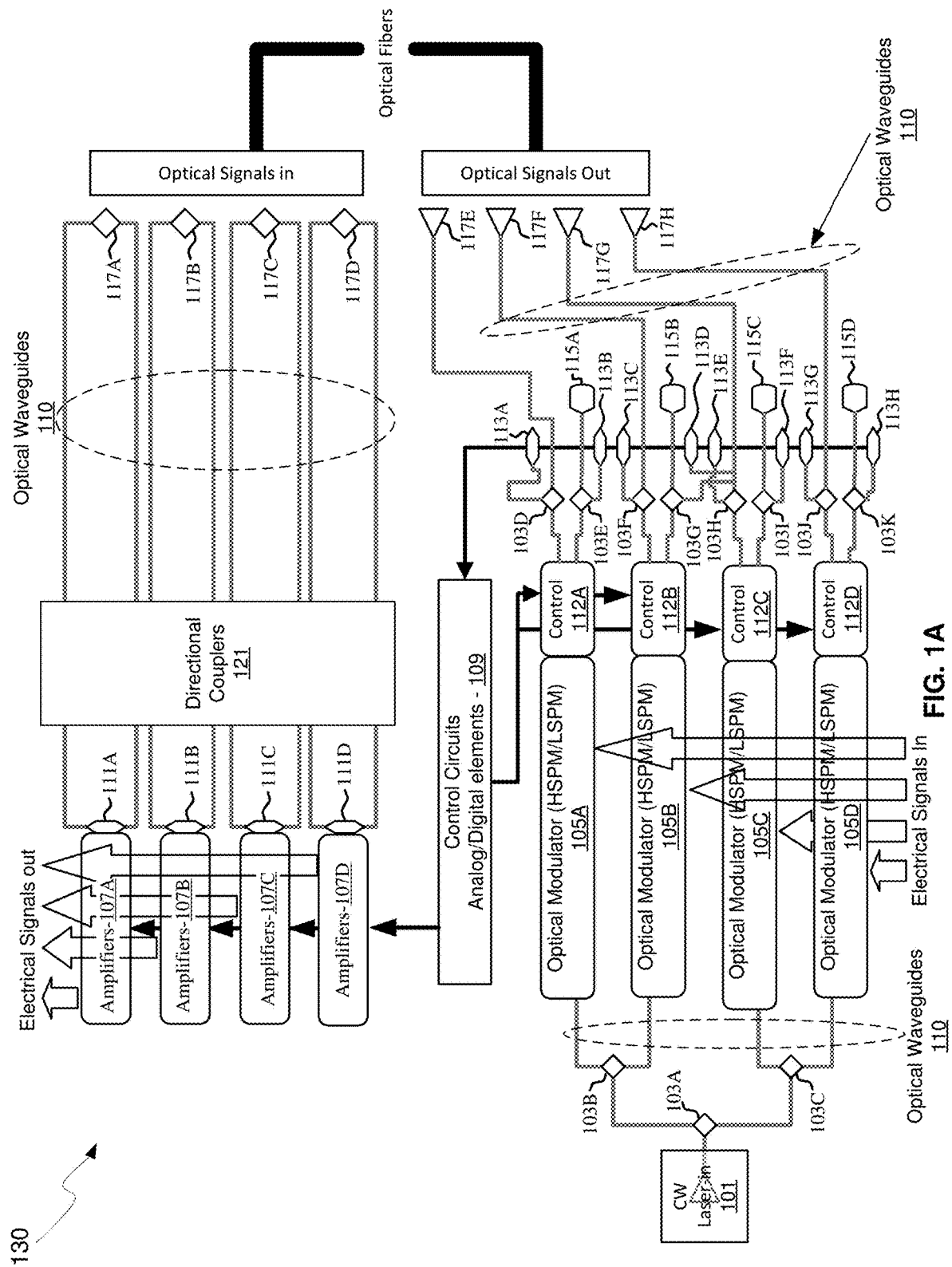
FIG. 1A is a block diagram of a photonically-enabled integrated circuit with waveguide delay based equalization with current and optical summing, in accordance with an example embodiment of the disclosure.

FIG. 1A is a block diagram of a photonically-enabled integrated circuit with waveguide delay based equalization with current and optical summing, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113H, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more CW optical signals to the coupler 103A. The photonically enabled integrated circuit 130 may comprise a single chip, or may be integrated on a plurality of die, such as one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter may comprise at least one input waveguide and at least two output waveguides. The couplers 103A-103C shown in FIG. 1A illustrates 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

In another example scenario, the Y-junction may be utilized in a parallel multi-channel transmitter, where a cascade of 1-by-2 splitters can be employed to have a single light source feed multiple channels. Interleaver-based multiplexers and demultiplexers constitute a third example where 1-by-2 splitters are among the building blocks.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is optimized.

The outputs of the optical modulators 105A-105D may be optically coupled via the waveguides 110 to the grating couplers 117E-117H. The couplers 103D-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
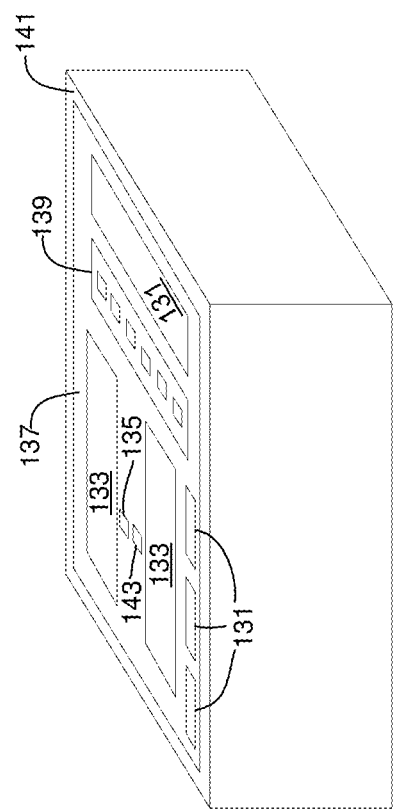
FIG. 1B is a diagram illustrating an exemplary photonically-enabled integrated circuit, in accordance with an example embodiment of the disclosure.

In another example embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The directional couplers 121 may receive optical signal in one or more inputs and couple output optical signals to one or more outputs. In this manner, a single optical signal may be split between two output waveguides 110, for example. The photodiodes 111A-111D may convert optical signals received from the grating couplers 117A-117D, via the directional couplers 121, into electrical signals that are communicated to the amplifiers 107A-107D for processing.

In the receiver subsystem implemented in a silicon chip, light is often coupled into a photodetector via a polarization-splitting grating coupler that supports coupling all polarization states of the fiber mode efficiently. The incoming signal is split by the PSGC into two separate waveguides in a polarization-diversity scheme, and therefore both inputs to the waveguide photodetectors are used. If two different PSGCs are required to couple into the same photodetector, then the PD has have four separate waveguide ports.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths, and equalizing signals for reducing and/or eliminating inter-symbol interference (ISI), which may be a common impairment in optical communication systems.

ISI may be introduced by a channel and/or the transmitter/receiver of the optical system, and can limit the maximum speed of the communication system. An equalizer may be utilized to mitigate ISI, and may comprise waveguide delay-based equalization. Equalizers may utilize delay elements and weight elements applied to each delayed signal, which may then be summed for an equalized signal with mitigated ISI. In an example scenario, this delay may be accomplished with optical delay and weight control may be enabled through electrical and/or optical means.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

Figure 1C:
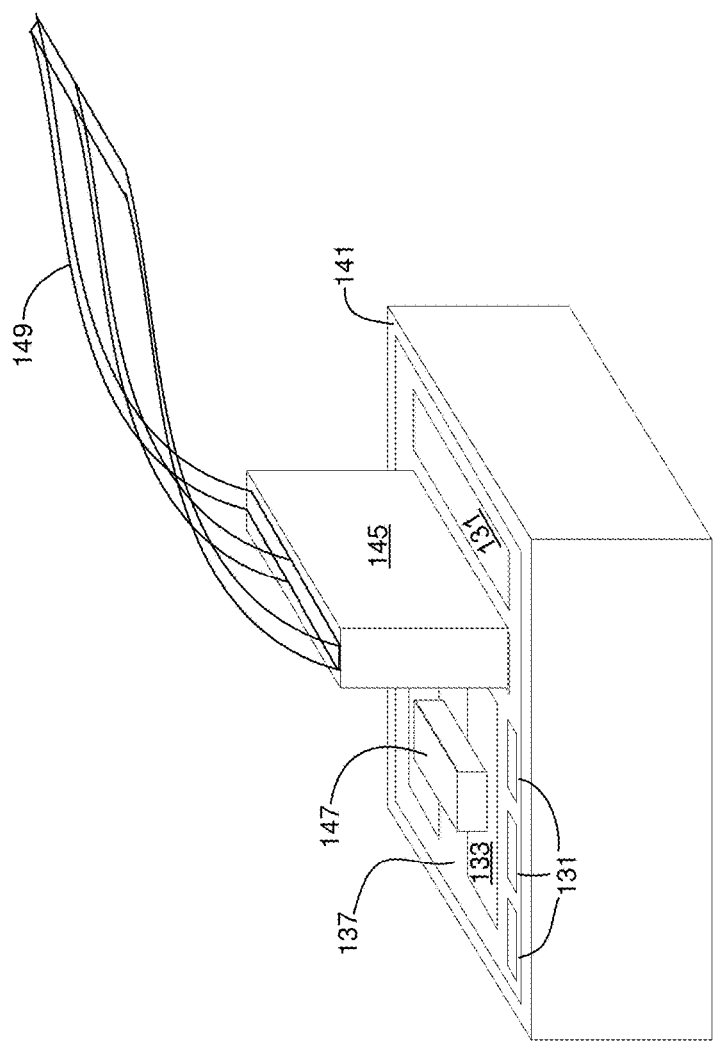
FIG. 1C is a diagram illustrating a photonically-enabled integrated circuit coupled to an optical fiber cable, in accordance with an example embodiment of the disclosure.
Figure 1C:
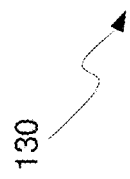

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130. In another example scenario, the IC 130 may comprise photonic devices on one die, such as a photonics interposer, and electrical devices on an electronics die, both of which may comprise CMOS die.

Figure 2:
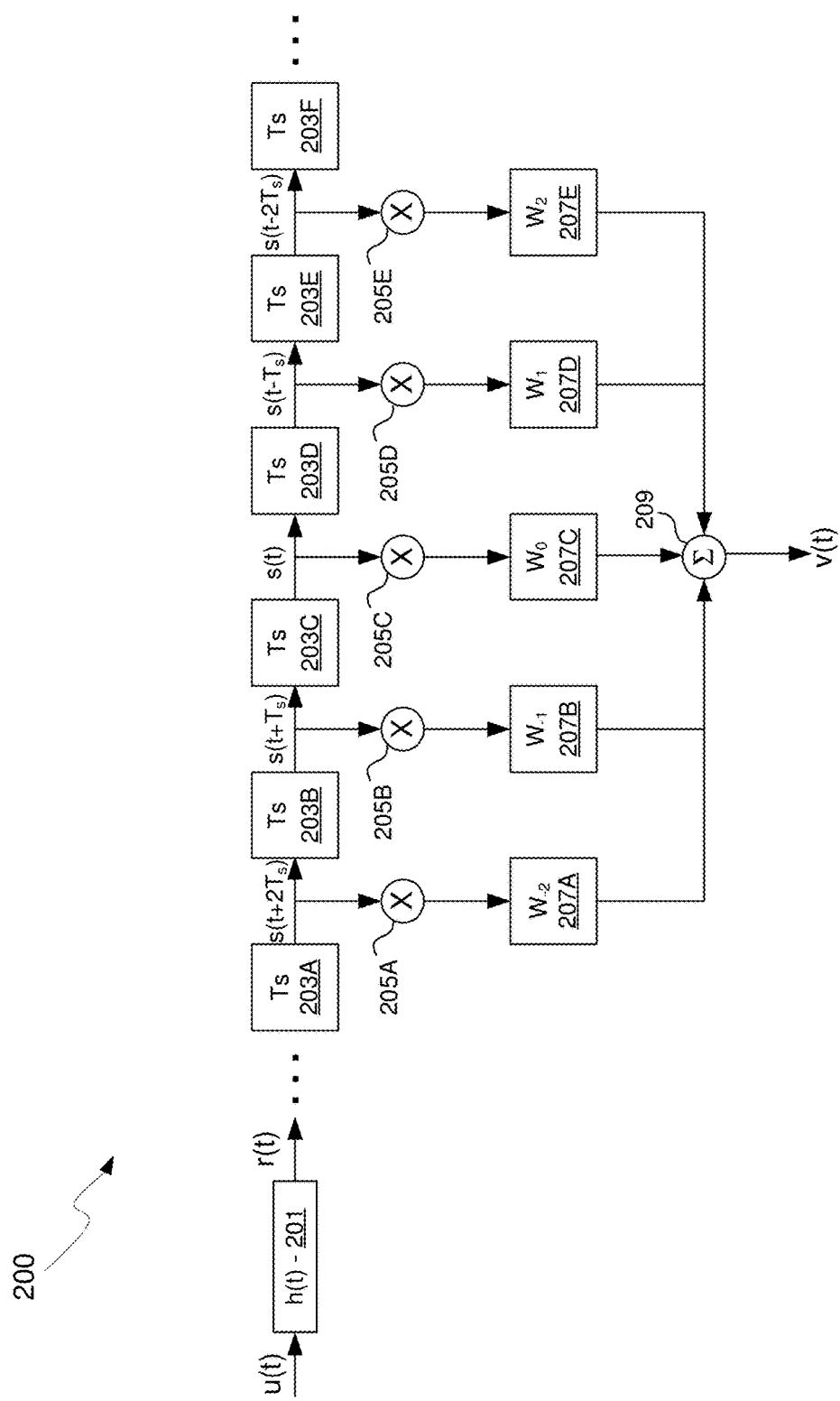
FIG. 2 illustrates an equalizer, in accordance with an example embodiment of the disclosure.

FIG. 2 illustrates an equalizer, in accordance with an example embodiment of the disclosure. Referring to FIG. 2, there is shown an equalizer 200 receiving an input signal u(t), which represents an original clean signal r(t) that is subject to the transfer function h(t) of a channel, either Tx or Rx, resulting in a signal with inter-symbol interference (ISI), which may occur in optical communication systems, and may limit the maximum speed of the communication system.

The equalizer 200 comprises a plurality of delay elements 203A-203F, multipliers 205A-205E, weight functions 207A-207E, and a summer 209. The equalizer 200 may generate a delayed version of the original signal r(t) with unintentional ISI utilizing delay elements 203A-203F, resulting in delayed signals s(t). The delayed signals s(t) may each be weighted independently, with WN being either positive or negative, using the multipliers 205A-205E and weight functions 207A-207E, and then summed using the summer 209 generating an output signal v(t). Theoretically, this structure may remove all ISI in a communication system, although in practical situations, non-idealities may be encountered. These may include noise added to the system, non-linearity of elements, variation in delay elements to the symbol period Ts, the weight WN may not be controllable or accurate, or the summation may not be accurate.

Figure 3:
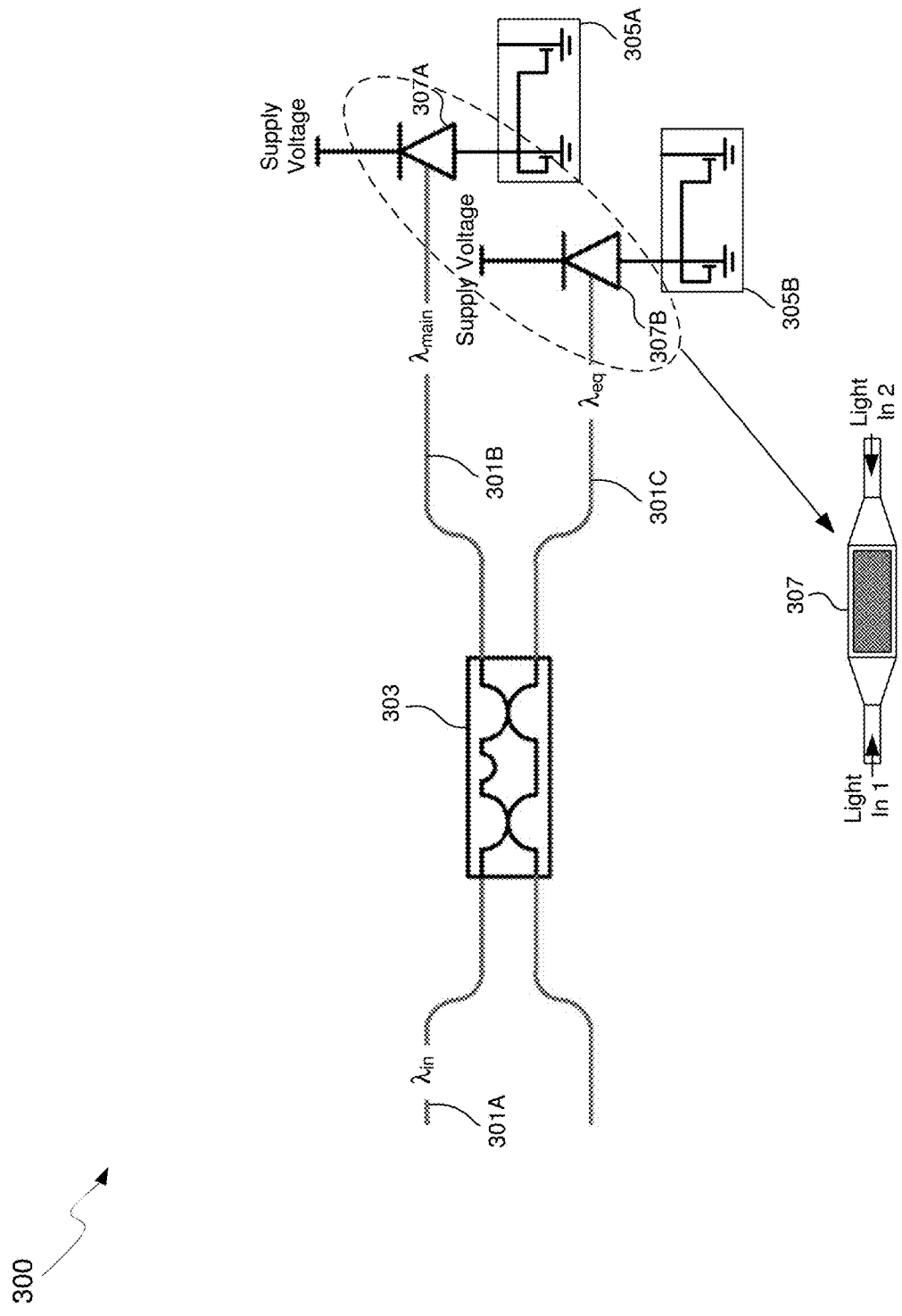
FIG. 3 illustrates signal weighting for an equalizer, in accordance with an example embodiment of the disclosure.
Figure 4:
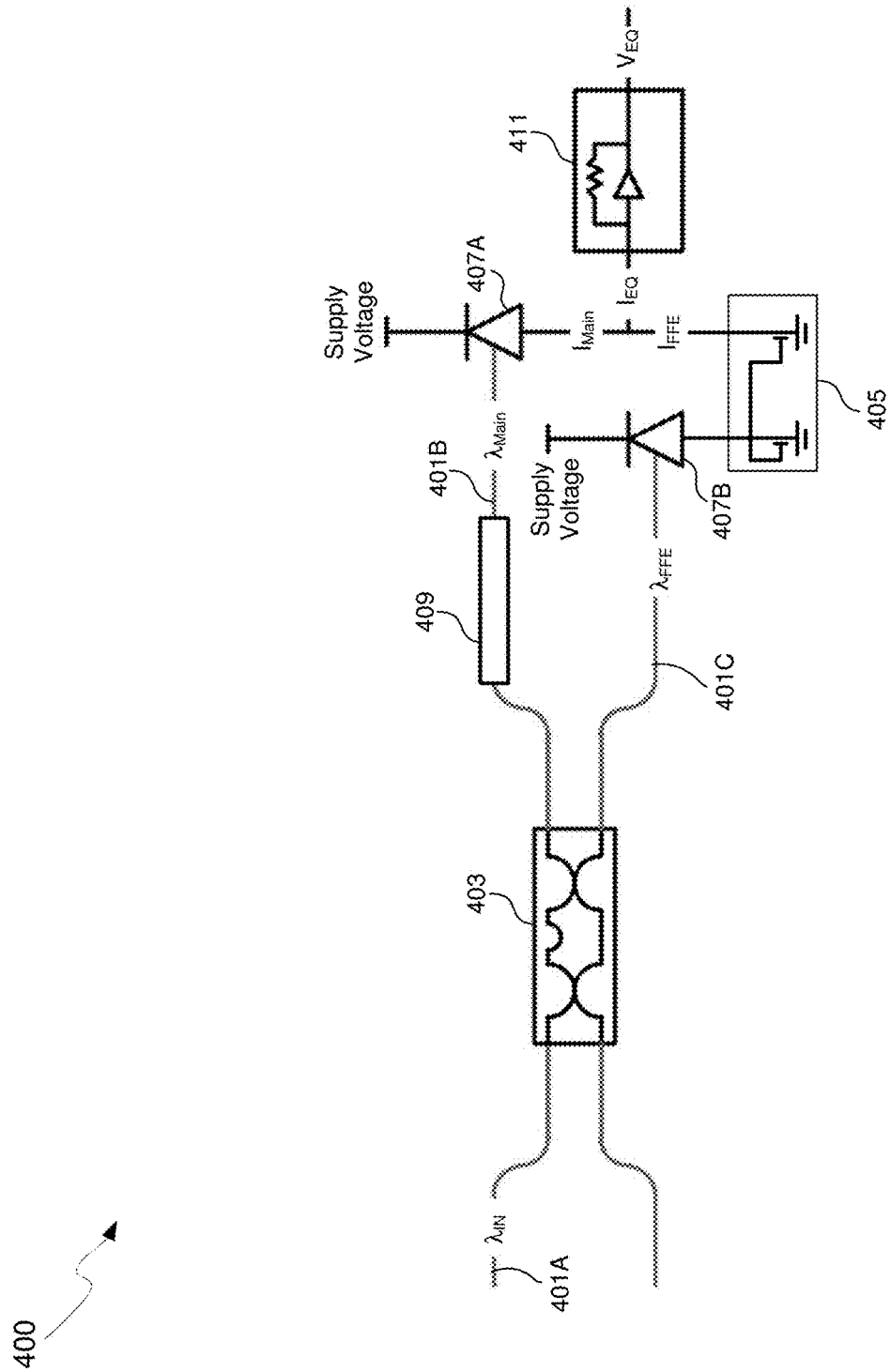
FIG. 4 illustrates a one-tap precursor equalizer with optical and electrical weight control, in accordance with an example embodiment of the disclosure.

In an example embodiment of the disclosure, the weight and delay elements may be implemented in the optical domain or a combination of optical and electrical, as described further with respect to FIGS. 3-5.

FIG. 3 illustrates signal weighting for an equalizer, in accordance with an example embodiment of the disclosure. Referring to FIG. 3, there is shown equalizer 300 comprising input waveguide 301A, a directional coupler 303, main and equalized waveguides 301B and 301C, photodiodes 307A and 307B, and current mirrors 305A and 305B coupled to each photodiode 307A and 307B. The directional coupler 303 may comprise a stabilized directional coupler with slightly increased length in one arm of the coupler to mitigate process variations or other causes of non-uniformity in optical coupling.

The directional coupler 303 may split the input signal $\lambda_{in}$, into two optical signals, $\lambda_{main}$ and $\lambda_{eq}$, with reasonable precision. Although a single directional coupler with two outputs is shown, the disclosure is not so limited as multiple directional couplers may be utilized to generate multiple output optical signals. The two optical paths may be separately converted into electrical current signals using the photodiodes 307A and 307B, and the current mirrors 305A and 305B each may amplify the current signal from its corresponding photodiode.

The current mirrors 305A and 305B may comprise two or more CMOS transistors where a drain current through a first CMOS transistor from the associated photodiode is mirrored to the drain of a second CMOS transistor with common gate coupling. The mirrors 305A and 305B are shown in FIG. 3 as NMOS devices with a supply voltage connected to the photodiode anode, but can also be configured with PMOS devices with ground connected to the photodiode cathode. The current mirrors may be a simple current mirror, or complex current mirror with many devices, where the device mirrors current with a ratio.

The amplification by the current mirrors 305A and 305B may be controlled electrically. The overall weight of the equalizer 300 may therefore be implemented with optical and electronic means, namely the optical splitting via directional coupler 303 and electrical amplification of the current mirrors 305A and 305B. With the weighted optical signals converted to electrical current signals, the currents may be summed by shorting the nodes together, such as at the outputs of the current mirrors 305A and 305B.

In addition, one or more photodetectors with multiple waveguide inputs may be utilized for signal summation, as illustrated by the multi-port photodetector 307 in the lower inset of FIG. 3. Multi-port photodetectors are described in more detail in U.S. patent application Ser. No. 15/592,774, which is hereby incorporated by reference in its entirety.

FIG. 4 illustrates a one-tap precursor equalizer with optical and electrical weight control, in accordance with an example embodiment of the disclosure. Referring to FIG. 4, there is shown equalizer 400 comprising input waveguide 401A, main and FFE waveguides 401B and 401C, a directional coupler 403, a waveguide delay 409, a pair of photodiodes 407A and 407B, a current mirror 405, and a transimpedance amplifier (TIA) 411. The directional coupler 403, waveguides 401A-401C, current mirror 405, photodiodes 407A and 407B may be share any and all aspects of the directional coupler 303, waveguides 301A-301C, current mirror 305, and photodiodes 307A and 307B described with respect to FIG. 3.

The waveguide delay 409 may comprise an appropriate length waveguide for creating an accurate delay without significant optical power loss. In a typical silicon photonics system, the waveguide delay may comprise a 3 mm waveguide, for example, which may result in ~40 ps of delay, suitable for a 25 G symbol per second signal. The TIA 411 may comprise a gain stage with a feedback impedance comprising a resistor and/or active elements, generating an output voltage proportional to the input current $I_{EQ}$.

In the example scenario of FIG. 4, one-tap precursor equalization may be enabled using summation through current summing and weight control via the directional coupler 403 and current mirror 405. Advantages of this type of weight control are that the current mirror 405 may be accurately adjustable for accurate weight control of the precursor tap, accurate summing may be possible in the current domain, and an accurate delay between the main and precursor tap may be maintained with less variation and power required compared to delay in the electrical domain.

An input optical signal $\lambda_{IN}$ may be communicated to the directional coupler 403 via input waveguide 401A, and portions of this input signal may be communicated to each of the output waveguides 401B and 401C via the directional coupler 403. Output waveguide 401B may be utilized to couple the directional coupler 403 to the waveguide delay 409 and subsequently to the photodiode 407A, while the other output waveguide 401C is coupled directly to photodiode 407B. The resulting electrical signal from photodiode 407B may be coupled to current mirror 405, with the difference current, $I_{EQ}$, between the output $I_{FFE}$ of the current mirror 405 and the output $I_{main}$ of the photodiode 407A coupled to the output TIA 411, resulting in an equalized output voltage $V_{EQ}$.

As with the equalizer 300 of FIG. 3, the amplification by the current mirror 405 in the equalizer 400 may be controlled electrically. The overall weight of the equalizer 400 may therefore be implemented with optical and electronic means, namely the optical splitting via directional coupler 403, and electrical amplification of the current mirror 405, while delay is provided by the delay waveguide 409. With the weighted optical signals converted to electrical current signals, the currents may be summed by coupling both nodes at the input of the TIA 411.

The adjustable current mirror 405 that provides current amplification enables less signal to be tapped from the main path and eliminates extra loading of the sensitive signal path after current to voltage conversion at the TIA 411. This structure also allows the equalization to be powered down completely and can be extended to additional equalization taps if desired. To this end, further directional couplers may be incorporated with additional delay lines, current mirrors, and photodetectors for each additional tap, as illustrated by the multi-tap equalizer schematic in FIG. 2, for example.

Figure 5A:
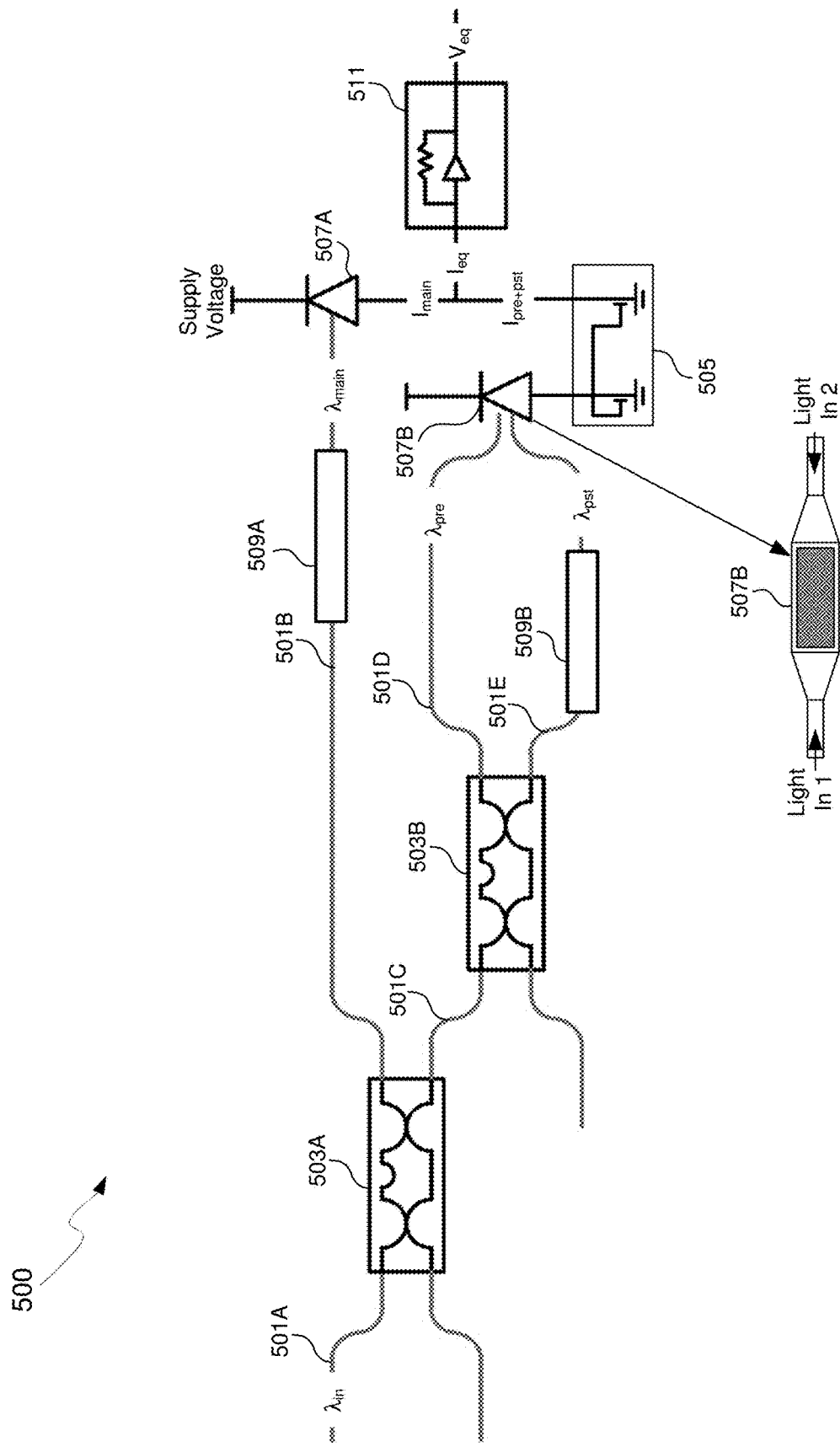
FIG. 5A Illustrates a one-tap pre-cursor, one-tap post-cursor equalizer, in accordance with an example embodiment of the disclosure.

FIG. 5A Illustrates a one-tap pre-cursor, one-tap post-cursor equalizer, in accordance with an example embodiment of the disclosure. Referring to FIG. 5A, there is shown equalizer 500 comprising waveguides 501A-501E, two directional couplers 503A and 503B, two waveguide delays 509A and 509B, two photodiodes 507A and 507B, a current mirror 505, delay lines 509A and 509B, and a TIA 511.

The directional couplers 503A and 503B, waveguides 501A-501E, current mirror 505, photodiodes 507A and 507B may share any and all aspects of the directional couplers, waveguides, current mirrors, and photodiodes described with respect to FIGS. 3 and 4, for example.

The waveguide delays 509A and 509B may each comprise an appropriate length waveguide for creating an accurate delay without significant optical power loss. In an example scenario, the 509B delay is greater than that of 509A to enable post-cursor equalization through the delay 509B path. The TIA 511 may comprise a gain stage with a feedback impedance comprising a resistor and/or active elements, generating an output voltage proportional to the input current $I_{EQ}$.

An input optical signal $\lambda_{in}$ may be received on input waveguide 501A and a portion of the signal may be coupled to each of the output waveguides 501B and 501C of the first directional coupler 503A, with one output waveguide 501B coupled to delay waveguide 509A and subsequently to photodiode 507A. The other output waveguide 501C may be coupled to second directional coupler 503B whose outputs may be coupled to the photodiode 507B via waveguide 501D and to second waveguide delay 509B via waveguide 501E, which is subsequently coupled to the photodiode 507B. The photodiode 507B comprises a two input port photodiode in this embodiment, as illustrated in the example structure shown in the lower inset of FIG. 5A.

As a two-port photodiode, photodiode 507B provides optical summing of the input optical signals $\lambda_{pre}$ and $\lambda_{pst}$. The current of the photodiode 507B may be amplified/mirrored by the current mirror 505, which may be summed with the current from the photodiode 507A at the TIA 511. The difference current, $I_{EQ}$, between the output $I_{pre+pst}$ of the current mirror 505 and the output $I_{main}$ of the photodiode 507A may be coupled to the output TIA 511, resulting in an equalized output voltage $V_{EQ}$.

The one-tap pre-cursor, one-tap post-cursor equalization equalizer 500 may utilize both current and optical summing and provide weight control with directional couplers and a current mirror. Advantages of this embodiment are that the current mirror 505 may be accurately adjustable for accurate weight control of the precursor tap, accurate summing may be possible in the current domain at the outputs of the photodiodes 507A and 507B, and an accurate delay between the main and precursor tap may be maintained with less variation and power required than when done in the electrical domain.

As with the equalizers 300 and 400 of FIGS. 3 and 4, the amplification by the current mirror 505 in the equalizer 500 may be controlled electrically. The overall weight of the equalizer 500 may therefore be implemented with optical and electronic means, namely the optical splitting via directional couplers 503A and 503B, and electrical amplification of the current mirror 505, and optical summing by the photodiode 507B while delay is provided by the delay waveguides 509A and 509B. With the weighted optical signals converted to electrical current signals, the currents may be summed by coupling both nodes at the input of the TIA 511.

Further advantages of the embodiment shown in FIG. 5A are that an adjustable current mirror 505 with amplification allows for less signal to be tapped from the main path $\lambda_{main}$, and the equalization path may be shut down completely if desired, eliminating extra loading of the sensitive signal path after current to voltage conversion by the TIA. Finally, the one-tap pre-cursor, one-tap post-cursor equalization equalizer 500 may achieve multi-tap equalization with a single photodiode/current mirror structure and may be extended to additional equalization steps if desired. To this end, further directional couplers may be incorporated with additional delay lines, current mirrors, and photodetectors for each additional tap, as illustrated by the multi-tap equalizer schematic in FIG. 2, for example.

Figure 5B:
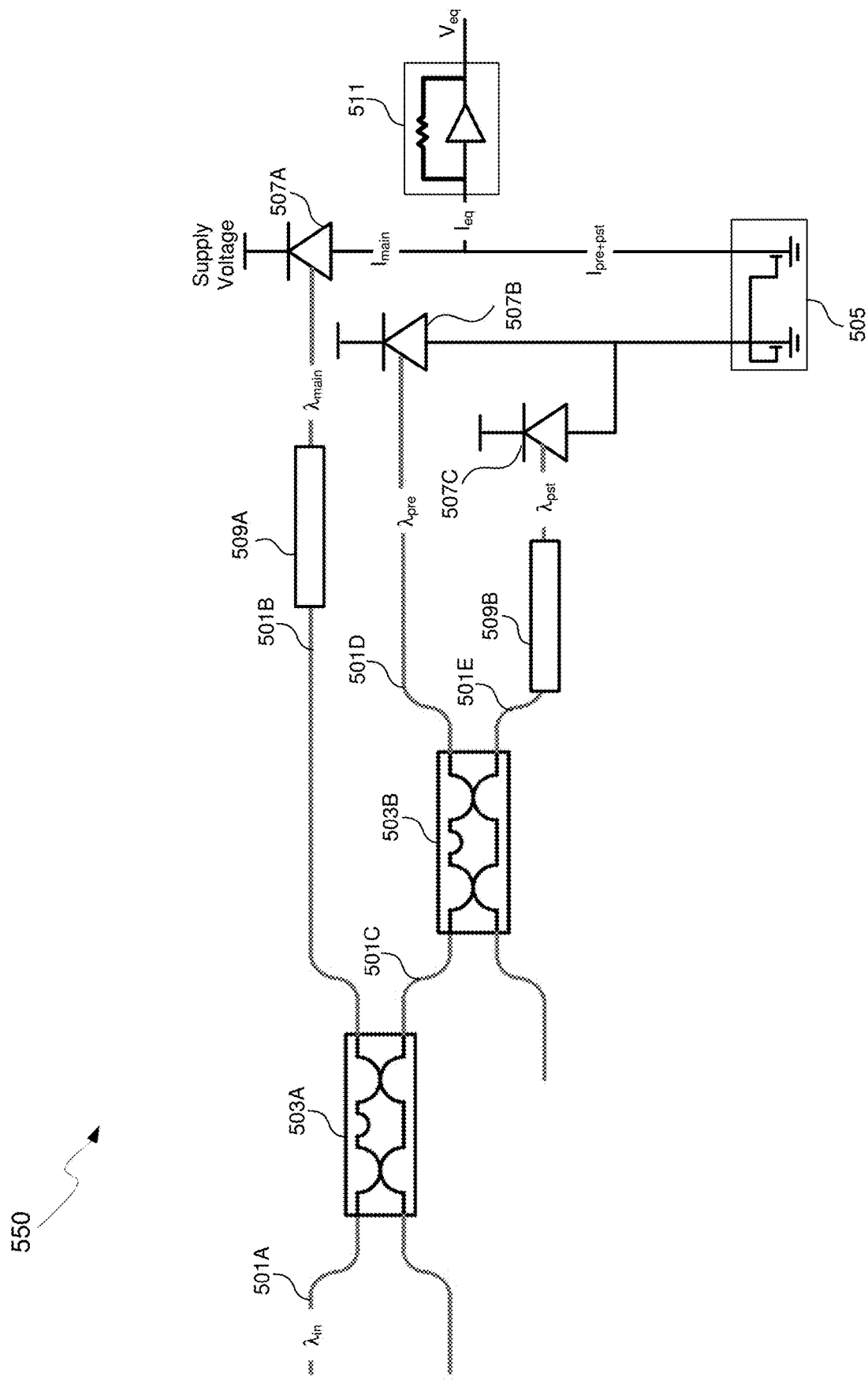
FIG. 5B Illustrates another example of a one-tap pre-cursor, one-tap post-cursor equalizer, in accordance with an example embodiment of the disclosure.

FIG. 5B Illustrates another example of a one-tap pre-cursor, one-tap post-cursor equalizer, in accordance with an example embodiment of the disclosure. Referring to FIG. 5B, there is shown equalizer 550 comprising waveguides 501A-501E, two directional couplers 503A and 503B, two waveguide delays 509A and 509B, three photodiodes 507A-507C, a current mirror 505, delay lines 509A and 509B, and a TIA 511.

The directional couplers 503A and 503B, waveguides 501A-501E, current mirror 505, photodiodes 507A-507C may be share any and all aspects of the directional couplers, waveguides, current mirrors, and photodiodes described with respect to FIGS. 3, 4, and 5A, for example.

The waveguide delays 509A and 509B may each comprise an appropriate length waveguide for creating an accurate delay without significant optical power loss. In an example scenario, the 509B delay is greater than that of 509A to enable post-cursor equalization through the delay 509B path. The TIA 511 may comprise a gain stage with a feedback impedance comprising a resistor and/or active elements, generating an output voltage proportional to the input current $I_{EQ}$.

An input optical signal $\lambda_{in}$ may be received on input waveguide 501A and a portion of the signal may be coupled to each of the output waveguides 501B and 501C of the first directional coupler 503A, with one output waveguide 501B coupled to delay waveguide 509A and subsequently to photodiode 507A. The other output waveguide 501C may be coupled to second directional coupler 503B whose outputs may be coupled to the photodiode 507B via waveguide 501D and to second waveguide delay 509B via waveguide 501E, which is subsequently coupled to the photodiode 507C.

In the example shown in FIG. 5B, as compared to the example shown in FIG. 5A, the multi-port photodiode 507B is replaced with two photodiodes 507B and 507C, with their output currents summed by coupling their output terminals, cathodes in this example, and then mirrored by the current mirror 505. The resulting current may be summed with the current from the photodiode 507A at the TIA 511. The difference current, $I_{EQ}$, between the output $I_{pre+pst}$ of the current mirror 505 and the output $I_{Main}$ of the photodiode 507A may be coupled to the output TIA 511, resulting in an equalized output voltage $V_{EQ}$.

The one-tap pre-cursor, one-tap post-cursor equalization equalizer 550 may utilize current summing and provide weight control with directional couplers and a current mirror. Advantages of this embodiment are that the current mirror 505 may be accurately adjustable for accurate weight control of the precursor tap, accurate summing may be possible in the current domain at the outputs of the photodiodes 507A-507C, and an accurate delay between the main and precursor tap may be maintained with less variation and power required than when done in the electrical domain.

As with the equalizers 300 and 400 of FIGS. 3 and 4, the amplification by the current mirror 505 in the equalizer 550 may be controlled electrically. The overall weight of the equalizer 550 may therefore be implemented with optical and electronic means, namely the optical splitting via directional couplers 503A and 503B, and electrical amplification of the current mirror 505, and current summing of the output currents of the photodiodes 507A-507C, while delay is provided by the delay waveguides 509A and 509B.

Further advantages of the embodiment shown in FIG. 5B are that an adjustable current mirror 505 with amplification allows for less signal to be tapped from the main path $\lambda_{main}$, and the equalization path may be shut down completely if desired, eliminating extra loading of the sensitive signal path after current to voltage conversion by the TIA. Finally, the one-tap pre-cursor, one-tap post-cursor equalization equalizer 550 may achieve multi-tap equalization with a multiple photodiode/single current mirror structure and may be extended to additional equalization steps if desired. To this end, further directional couplers may be incorporated with additional delay lines, current mirrors, and photodetectors for each additional tap, as illustrated by the multi-tap equalizer schematic in FIG. 2, for example.

In an example embodiment, a method and system are disclosed for waveguide delay based equalization with current and optical summing in optical communication. In this regard, aspects of the disclosure may comprise an optoelectronic receiver comprising a directional coupler, two or more photodiodes, and one or more current mirrors. The optoelectronic receiver is operable to: receive an input optical signal; split the input optical signal into first and second optical signals using the directional coupler; generate a first electrical from the first optical signal using a first photodiode; generate a second electrical signal from the second optical signal using a second photodiode; amplify the second electrical signal using the current mirror; and sum the first electrical signal with the amplified second electrical signal.

The optoelectronic receiver may be operable to delay the first optical signal before generating the first electrical signal, and may do so by using a waveguide delay. The optoelectronic receiver may be operable to generate an equalized output voltage by coupling the summed first electrical signal and amplified second electrical signal utilizing a transimpedance amplifier. The optoelectronic receiver may be operable to split the second optical signal into third and fourth optical signals using a second directional coupler before generating the second electrical signal.

The second photodetector may comprise two inputs for receiving optical signals. The optoelectronic receiver may be operable to delay the fourth optical signal using a waveguide delay. The optoelectronic receiver may be operable to weight the first and second optical signals by configuring a coupling coefficient of the directional coupler. The optoelectronic receiver may be on a silicon complementary metal oxide semiconductor (CMOS) photonic die.

In another example embodiment, a method and system are disclosed for waveguide delay based equalization with current and optical summing in optical communication. In this regard, aspects of the disclosure may comprise an optoelectronic receiver comprising first and second directional couplers, first and second photodiodes, first and second waveguide delays, and a current mirror. The optoelectronic receiver is operable to: receive an input optical signal; split the input optical signal into first and second optical signals using the first directional coupler; delay the first optical signal utilizing the first delay waveguide; generate a first electrical from the delayed first optical signal using a first photodiode; split the second optical signal into third and fourth optical signals; delay the fourth optical signal using the second delay waveguide; generate a second electrical signal from the third optical signal and the delayed fourth optical signal using the second photodiode; amplify the second electrical signal using the current mirror; and sum the first electrical signal with the amplified second electrical signal.

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
   in an optoelectronic receiver comprising a directional coupler, two or more photodetectors, and one or more current mirrors:
   receiving an input optical signal;
   splitting the input optical signal into first and second optical signals using the directional coupler;
   generating a first electrical signal from the first optical signal using a first photodetector;
   generating a second electrical signal from the second optical signal using a second photodetector;
   mirroring the second electrical signal using one of the one or more current mirrors; and
   summing the first electrical signal with the mirrored second electrical signal.

2. The method according to claim 1, comprising delaying the first optical signal before generating the first electrical signal.

3. The method according to claim 2, comprising delaying the first optical signal using a waveguide delay.

4. The method according to claim 1, comprising generating an equalized output voltage by coupling the summed first electrical signal and mirrored second electrical signal utilizing a transimpedance amplifier.

5. The method according to claim 1, comprising splitting the second optical signal into third and fourth optical signals using a second directional coupler before generating the second electrical signal.

6. The method according to claim 5, wherein the second photodetector comprises two inputs for receiving optical signals.

7. The method according to claim 5, comprising delaying the fourth optical signal using a waveguide delay.

8. The method according to claim 7, comprising coupling the delayed fourth optical signal to a third photodetector and summing its output current with an output current from the second photodetector.

9. The method according to claim 1, comprising weighting the first and second optical signals by configuring a coupling coefficient of the directional coupler.

10. The method according to claim 1, wherein the optoelectronic transceiver is on a silicon complementary-metal oxide semiconductor (CMOS) photonics die.

11. A system for communication, the system comprising:
    an optoelectronic receiver comprising a directional coupler, two or more photodetectors, and one or more current mirrors, the optoelectronic receiver being operable to:
    receive an input optical signal;
    split the input optical signal into first and second optical signals using the directional coupler;
    generate a first electrical signal from the first optical signal using a first photodetector;
    generate a second electrical signal from the second optical signal using a second photodetector;
    mirror the second electrical signal using one of the one or more current mirrors; and
    sum the first electrical signal with the mirrored second electrical signal.

12. The system according to claim 11, wherein the optoelectronic receiver is operable to delay the first optical signal before generating the first electrical signal.

13. The system according to claim 12, wherein the optoelectronic receiver is operable to delay the first optical signal using a waveguide delay.

14. The system according to claim 11, wherein the optoelectronic receiver is operable to generate an equalized output voltage by coupling the summed first electrical signal and mirrored second electrical signal utilizing a transimpedance amplifier.

15. The system according to claim 11, wherein the optoelectronic receiver is operable to split the second optical signal into third and fourth optical signals using a second directional coupler before generating the second electrical signal.

16. The system according to claim 15, wherein the second photodetector comprises two inputs for receiving optical signals.

17. The system according to claim 15, wherein the optoelectronic receiver is operable to delay the fourth optical signal using a waveguide delay.

18. The system according to claim 15, wherein the optoelectronic receiver is operable to couple the delayed fourth optical signal to a third photodetector and sum its output current with an output current from the second photodetector.

19. The system according to claim 11, wherein the optoelectronic receiver is operable to weight the first and second optical signals by configuring a coupling coefficient of the directional coupler.

20. A system for communication, the system comprising:
an optoelectronic receiver comprising first and second directional couplers, first and second photodetectors, first and second waveguide delays, and a current mirror, the optoelectronic receiver being operable to:
receive an input optical signal;
split the input optical signal into first and second optical signals using the first directional coupler;
delay the first optical signal utilizing the first delay waveguide;
generate a first electrical signal from the delayed first optical signal using a first photodetector;
split the second optical signal into third and fourth optical signals;
delay the fourth optical signal using the second delay waveguide;
generate a second electrical signal from the third optical signal and the delayed fourth optical signal using the second photodetector;
mirror the second electrical signal using the current mirror; and
sum the first electrical signal with the mirrored second electrical signal.

\* \* \* \* \*